(12) United States Patent
Lehnert et al.

(10) Patent No.: US 8,926,748 B2
(45) Date of Patent: Jan. 6, 2015

(54) MATTING AGENT

(75) Inventors: Hans-Rudolf Lehnert, Westhofen (DE); Markus Kretzschmar, Altrip (DE)

(73) Assignee: Grace GmbH & Co. KG, Worms (DE)

( * ) Notice: Subject to any disclaimer, the term of this patent is extended or adjusted under 35 U.S.C. 154(b) by 748 days.

(21) Appl. No.: 12/312,696

(22) PCT Filed: Dec. 5, 2007

(86) PCT No.: PCT/EP2007/010558
§ 371 (c)(1),
(2), (4) Date: Nov. 18, 2009

(87) PCT Pub. No.: WO2008/068003
PCT Pub. Date: Jun. 12, 2008

(65) Prior Publication Data
US 2010/0071593 A1 Mar. 25, 2010

Related U.S. Application Data

(60) Provisional application No. 60/873,365, filed on Dec. 7, 2006.

(51) Int. Cl.
| C09D 7/00 | (2006.01) |
| C09C 3/10 | (2006.01) |
| C08K 9/08 | (2006.01) |
| C08K 9/04 | (2006.01) |
| C09C 1/30 | (2006.01) |

(52) U.S. Cl.
CPC . *C09D 7/005* (2013.01); *C08K 9/08* (2013.01); C08K 2201/003 (2013.01); *C08K 9/04* (2013.01); *C01P 2004/61* (2013.01); *C01P 2006/12* (2013.01); *C01P 2006/14* (2013.01); *C09C 1/3072* (2013.01); *C09C 3/10* (2013.01)
USPC ........... 106/502; 106/447; 106/450; 106/460; 106/471; 106/491; 428/403; 428/404

(58) Field of Classification Search
USPC ................ 106/447, 450, 460, 471, 491, 502; 428/403, 404
See application file for complete search history.

(56) References Cited

U.S. PATENT DOCUMENTS

| 4,097,302 | A | 6/1978 | Cohen et al. | 106/312 |
| 5,081,322 | A | 1/1992 | Winter et al. | 585/9 |
| 5,643,846 | A | 7/1997 | Reddy et al. | 502/104 |
| 5,919,723 | A | 7/1999 | Milani et al. | 502/116 |
| 6,194,341 | B1 | 2/2001 | Canich et al. | 502/113 |
| 6,750,307 | B2 | 6/2004 | Weng et al. | 526/348 |
| 6,761,764 | B2 | 7/2004 | Krendlinger et al. | 106/502 |
| 2004/0047792 | A1 | 3/2004 | Schubert et al. | 423/335 |
| 2005/0090585 | A1 | 4/2005 | Iwahashi et al. | 9/10 |

FOREIGN PATENT DOCUMENTS

| DE | 19516253 | 10/1996 | ........... C01B 33/157 |
| EP | 0922671 | 10/2003 | ........... C01B 33/193 |
| EP | 1291727 B1 * | 11/2005 | |
| GB | 798621 | 7/1958 | |
| GB | 1236775 | 6/1971 | ............. C01B 33/18 |
| GB | 1461511 | 1/1977 | ............... C09D 7/00 |
| GB | 1538474 | 1/1979 | ............. C08L 91/06 |
| KR | 20040071840 A * | 10/2004 | |
| KR | 2005-027967 | 8/2005 | ............... C09D 5/33 |
| WO | 03/042293 | 8/2005 | ............... C08K 9/08 |

OTHER PUBLICATIONS

Eagleson, Concise Encyclopedia of Chemistry, Walter de Gruyter & Co., (1993) p. 486.*
Clariant, Licowax 130 PE powder (Nov. 2013).*

* cited by examiner

*Primary Examiner* — David M Brunsman
(74) *Attorney, Agent, or Firm* — Beverly J. Artale

(57) ABSTRACT

A matting agent useful for the preparation of matted coatings comprising, inorganic oxide particulates; and wax coated on the inorganic oxide particulates, wherein the wax possesses a crystallinity of about 50% or more and said wax is present in an amount ranging from 15 wt % to 30 wt % based on a total weight of said matting agent.

19 Claims, 5 Drawing Sheets

MATTING AGENT

This application claims the benefit of U.S. Patent Application Ser. No. 60/873,365 filed Dec. 7, 2006.

FIELD OF THE INVENTION

This invention relates to wax coated inorganic oxide matting agents useful for the production of coatings, coating formulations made therefrom and the resulting matted coatings

BACKGROUND OF THE INVENTION

It is well known that micronised waxes will impart desirable features to paint or lacquer film or coatings (e.g., flexibility, feel and gloss). Inorganic oxide particulates have also been used to import matting to the coating. When an inorganic oxide particulate is coated/impregnated with wax a process usually performed by jointly grinding the oxide particulate and wax in a fluid energy mill (microniser), further product benefits are immediately available. The wax can improve compatibility of the oxide particulate with the paint or lacquer preventing interaction with other components in the formulation, but another function is to prevent the formation of hard sediment during storage, which is not redispersible. Whilst the mechanism by which this protection is afforded is still not fully understood, its benefit to the paint or lacquer manufacturer is widely recognized because, if hard sediments that cannot be redispersed are formed, none of the benefits described above can be realized.

Two types of wax-coated oxide particulates are generally disclosed in the literature. GB Patent No. 798,621 discloses a silica-matting agent produced by co-milling an intermediate density silica gel with a microcrystalline wax in a fluid energy mill. GB Patent No. 1,236,775 teaches a silica matting agent can be prepared by treating precipitated silica with an aqueous emulsion or dispersion of a wax, including thermoplastic materials. The properties of the silica matting agents prepared by the so-called "dry" co-micronising route have been further improved by adding fatty acids (GB Patent No. 1,461,511) or synthetic polyethylene waxes of varying molecular weight (U.S. Pat. No. 4,097,302) to the microcrystalline wax before feeding to the fluid energy mill. The former improves the dispersibility of the wax coated products, whereas the latter shows products having enhanced settlement characteristics compared with commercially available materials. The "dry" processing routes described above use temperatures in excess of the melting points of the waxes or wax blends whereas GB Patent No. 1,538,474 discloses a process which can produce satisfactory wax coated silicas at micronising temperatures of below 50° C., where functional waxes such as montan acid ester are employed.

U.S. Pat. No. 5,326,395 describes a matting agent that utilizes a ternary blend of waxes, including a hard microcrystalline wax, a plasticizing microcrystalline wax, and a synthetic polyethylene wax, that is coated on a silica particulate. U.S. Patent Application No. 2004/0047792 A1 relates to a wax coated precipitated silica matting agent wherein the wax may include polyethylene waxes, Fischer-Tropsch waxes, or silicone waxes.

U.S. Pat. No. 6,761,764 B2 describes the use of wax particles, without an inorganic oxide component, for use as matting agents in various coatings. The waxes used include a mixture of olefin waxes and various other waxes.

There remains a need in the coating industry for an inorganic oxide matting agent that provides acceptable matting properties while also providing improved abrasion resistance and chemical stability.

SUMMARY

Figure 1:
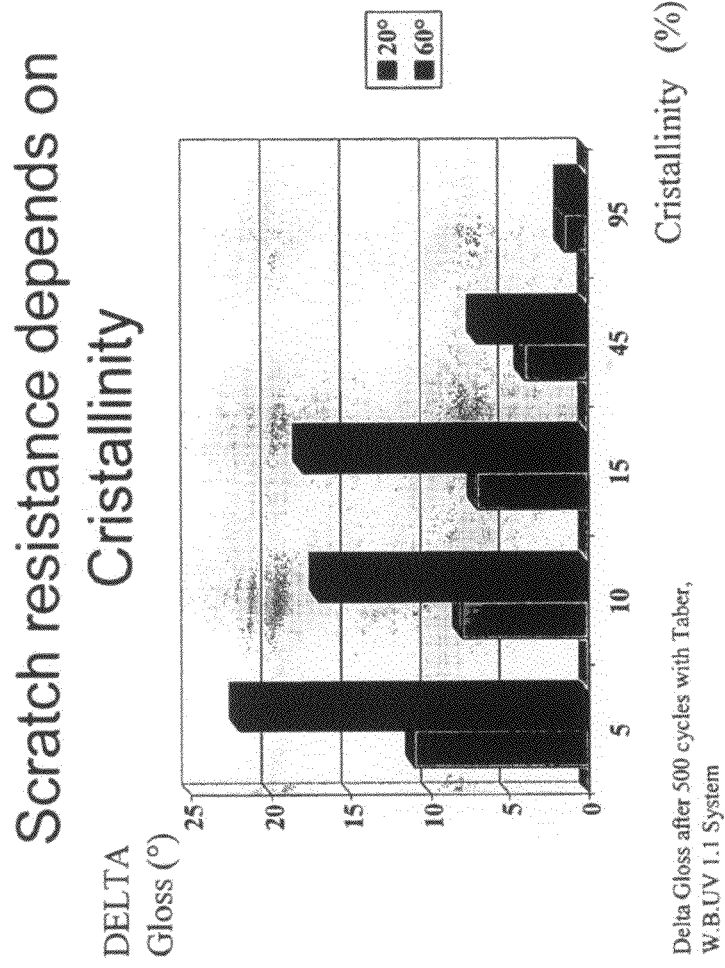
FIG. 1 illustrates the influence by wax crystallinity on abrasion resistance of the coatings according to the present invention.

The present invention relates to a matting agent useful for the preparation of matted coatings including, inorganic oxide particulates and wax coated on or impregnated in the inorganic oxide particulates, wherein the wax possesses a crystallinity of about 50% or more.

The present invention also relates to a coating formulation useful for the preparation of matted coatings including inorganic oxide particulates, and wax coated on or impregnated in the inorganic oxide particulates, wherein the wax possesses a crystallinity of about 50% or more.

The present invention further relates to a matted coating including inorganic oxide particulates, and wax coated on or impregnated in the inorganic oxide particulates, wherein the wax possesses a crystallinity of about 50% or more.

DESCRIPTION OF THE INVENTION

The terms referred to herein are to be given their accepted meaning in the industry unless otherwise defined herein.

The term "particulate" is used to refer to solid, either singularly or a collection thereof (e.g., powder) including spheroid(s), granule(s), fragment(s), or pieces(s) of matter having regular or irregular shape or surface.

The term "inorganic oxides" is used to describe a binary compound of an element and oxygen and include metal and semimetal oxides. Examples of such oxides may comprise $SiO_2$, $Al_2O_3$, $AlPO_4$, $MgO$, $TiO_2$, $ZrO_2$, $Fe_2O_3$ or mixtures thereof. Mixed inorganic oxides include $SiO_2$, $Al_2O_3$, $MgO$, $SiO_2$, $Al_2O_3$, $Fe_2O_3$ etc., which may be prepared by conventional preparation techniques (e.g., coblending, coprecipitating, cogelling etc.). The oxides may be in a variety of forms, including gelled, precipitated, fumed, colloidal, etc.

Inorganic oxides may also include natural minerals, processed/activated minerals, montmorillonite, attapulgite, bentonite, palygorskite, Fuller's earth, diatomite, smectite, hormite, quartz sand, limestone, kaolin, ball clay, talc, pyrophyllite, perlite, sodium silicate, sodium aluminum silicate, magnesium silicate, magnesium aluminum silicate, silica hydrogel, silica gel, fumed silica, precipitated silica, dialytic silica, alumina zeolite, molecular sieves, diatomaceous earth, reverse phase silica, bleaching clay, and mixtures thereof.

In one embodiment, the present invention relates to matting agent useful for the preparation of matted coatings comprising inorganic oxide particulates and wax coated on the inorganic oxide particulates, wherein the wax possesses a crystallinity of about 50% or more. The wax may possess a crystallinity of about 55% or more, preferably 60% or more, more preferably 70% or more, and even more preferably 80% or more. In another embodiment, the wax possesses a crystallinity of 90% or more (e.g., 90, 91, 92, 93, 94, 95, 96, 97, 98, 99, or 100%). Crystallinity of the polymer is measured by differential scanning calorimetry using ASTM E 793 (1985 (Rev. 1989)).

Waxes of the present invention having the crystallinity described herein include polymers that possess crystalline and amorphous regions, if the crystallinity is less than 100%. The polymers of the present invention may also be described as isotactic or syndiotactic, as compared to atactic polymers, that is, the polymers possess regular, and not irregular arrangement of its atoms or pendant groups. For example, highly crystalline (e.g., above 50%) polymers include polyolefins, polystyrene, polyamides, polyketones, polyesters, and the like. Preferably, the polymer is a polyolefin, since these polymers melt at lower temperatures. Polyolefins of the present invention may include polyalkylenes, such as polyethylene, polymethylene, polypropylene, polybutene and the like, or mixtures thereof. More preferably, a wax of the present invention may be isotactic and/or syndiotactic polyethylene, polypropylene or mixtures thereof, and are even more preferably of the polyethylene type. Suitable waxes contain regular polymer chains enabling a cristallinity of more than 90%. Suitable waxes have a weight-average molar mass from 1000 to 30 000 g/mol, with a drop point of 90 to 140° C., preferably from 110° C. to 140° C. The waxes have melt viscosities, measured at a temperature 140° C. of not more than 1000 mPas, preferably from 10 to 500 mPas.

The polymers of the present invention may be synthesized using any conventional method that provides crystallinity of more than 50%. For example, polyolefins may be produced using Ziegler-Natta polymerization or by the metal-organic catalysis polymerization. Preferably, the metal organic catalysis polymerization is of the metallocene type. Such processes are described, for example, in U.S. Pat. Nos. 5,081,322; 5,643,846; 5,919,723; 6,194,341; and 6,750,307.

The inorganic oxide of the present invention may include a variety of oxides as mentioned herein. However, in one preferred embodiment, the inorganic oxide is silica. A description of this embodiment follows, but any inorganic oxide may also be used instead of silica.

The silica used to prepare the invention can be that used to prepare conventional porous silica matting agents, provided the silica has a pore volume in the range of 0.8 to 2.4 cc/g. Preferably, the pore volume of the silica is in the range of 0.9-1.2 cc/g. The pore volume referred to herein is determined by nitrogen porosimetry, described later below.

Silica gels are preferred. Hydrogels, xerogels and aerogels are all suitable. The general procedure to prepare inorganic gels is by the acid neutralization of salt solutions of metals or metalloids, which, thereafter upon standing form hydrogels. The hydrogels must then be washed to remove the relatively high concentration of soluble salts. Treatment during this washing stage determines physical properties, such as porosity, of the final product. The techniques for obtaining those properties are known. For example, final gel pore volumes and surface areas are dependent upon the pH and temperature of the wash solution, the rate of wash, the particle size of the hydrogel, and the duration of wash. Generally, pore volume can be limited by shortening the duration of the washing periods. However, the specific washing conditions can vary depending on the particular inorganic hydrogel used, and are not per se critical to the invention, provided that the aforementioned pore volumes are developed in the final gel. As mentioned above, those skilled in the art are familiar with these washing conditions and are readily able to determine suitable washing conditions in which to form the desired pore volumes for use in this invention. For example, silica gels washed at a starting pH of 3-5 at 50-90° C. for 5-25 hours form gels (aerogets) having pore volumes in the aforementioned range.

Particularly suitable silicas include hydrogels used to make commercially available silica matting agents such as the Syloid® matting agents from W. R. Grace & Co.-Conn.

The wax-containing matting agent of this invention can be prepared by conventional co-milling processes in which the wax is melted simultaneously with the comminution of the silica to the desired particle size of about 2 to 12 microns. Such a process is most effectively carried out in a fluid energy mill or microniser such as the Alpine® mill available from Hosokawa Micron Limited and the Condux® universal mill available from Netzsch, Inc. The operating temperature can then be varied according to the requirements of the wax. The inlet temperature of the air being supplied to the fluid energy mill should at least be high enough to ensure the wax melts within the residence time profile of the milling equipment. The wax is added to the mill so that the final product has a wax content of 15 to 30% by weight.

Another embodiment according to the present invention relates to a coating formulation useful for the preparation of matted coatings including inorganic oxide particulates, wax coated on the inorganic oxide particulates, and other coating formulation components, wherein the wax possesses a crystallinity of about 50% or more.

In addition to the inorganic oxide and wax described herein, the coating formulation may include conventional coating components. For example, in the preparation of matting agents with organic material, waxes are generally added in a concentration of 0.1-10%. The waxes in the conventional formulations are PE waxes, PP waxes, FT paraffins, natural waxes, montan waxes, macro- and microcrystalline paraffin waxes, amide waxes as well as blends of these. Blends of silica and wax are present as powder mixtures and melt mixtures. These waxes are added in the shape of flakes, pellets, powders, dispersions or micronisates, preferably as a fine micronized powder. Other coating components include binders, such as nitrocellulose, isocyanides, polyoles, acrylates, etc.; biocides; surfactants; defoamers; thickeners; photoinitiators; UV stabilizers; antioxidants; rheology modifiers; dyes; sequestering agents; biocides; dispersants; pigments, such as, titanium dioxide, organic pigments, carbon black; extenders, such as, calcium carbonate, talc, clays, silicas and silicates; filters, such as glass or polymeric microspheres, quartz and sand; anti-freeze agents; plasticizers; adhesion promoters such as silanes; coalescents; wetting agents; slip and anti-skid additives; crosslinking agents; defoamers; colorants; tackifiers; waxes; preservatives; freeze/thaw protectors; corrosion inhibitors; anti-flocculants; and solvents and diluents, such as xylene, mineral spirits, gasoline, water, etc.

Another embodiment of the present invention regards matted coating including inorganic oxide particulates and wax coated on or impregnated in the inorganic oxide particulates, wherein the wax possesses a crystallinity of about 50% or more.

The coating is prepared by utilizing the coating formulations described herein. Initially, the matting agent of the present invention is prepared by blending the inorganic oxide with the wax in a mixer (e.g., Henschel mixer) for a period of time (e.g., 10 to 20 minutes) and at a speed (e.g., 2000 to 3000 rpm) that uniformly blends the oxide-wax mixture. The mixture is then placed in a mill (e.g., fluid energy mill such as Alpine AFG 100 available from Alpine AG so as to allow the wax to impregnate and coat the oxide, and to provide a uniform and desirable particle size. The milling is typically performed at a temperature of 50 to 200° C. for a period of 10 to 15 minutes per 600 gr.

Figure 2:
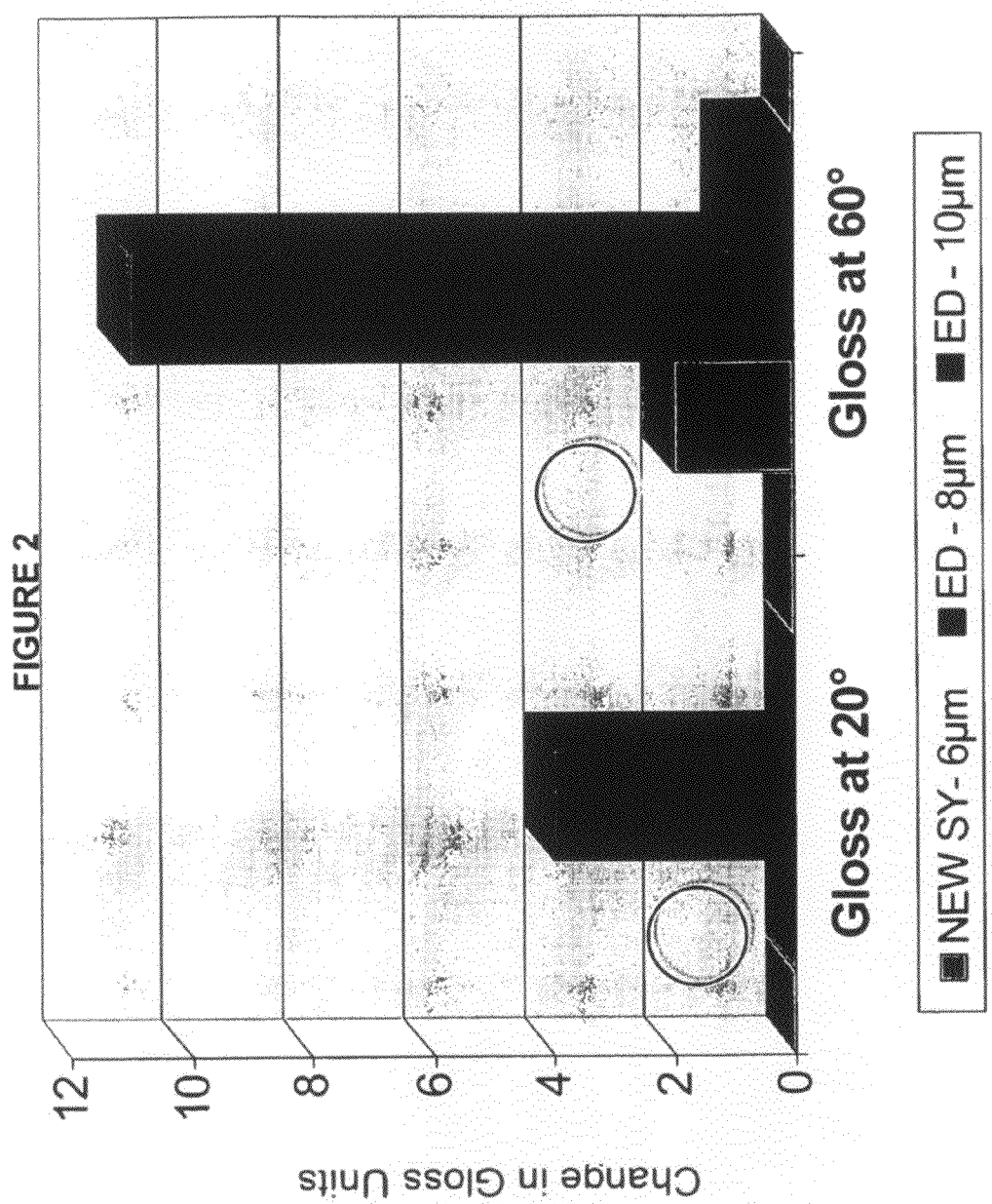
FIG. 2 illustrates the abrasion resistance of coatings according to the present invention compared with others.

Subsequent to the formation of the matting agent, the coating formulation is prepared by dispersing the matting agent in ready to use coating, including lacquer, paint, varnish or ink using a mixer (such as a Dispermat CN10-F2 mixer available from VMA-Getzmann GmbH) at a speed (e.g., 1000 to 5000 rpm) and period of time until the matting agent is well dispersed (e.g., for a period of 5 to 30 minutes). The coating may then applied at a typical thickness (e.g., 25 to 100 micron) onto a substrate, such as wood, metal, plastic, etc. using an Erichsen coater, such as a K-Control Coater K101 available from Erichsen GmbH & Co. KG. The coating is then dried for a period of time (approximately 24 h) at room temperature.

e.g., k is 1%, 2%, 3%, 4%, 5% ... 50%, 51%, 52% ... 95%, 96%, 97%, 98%, 99%, or 100%. Moreover, any numerical range represented by any two values of R, as calculated above is also specifically disclosed.

abrasive wheels rotating in clockwise fashion at a speed of 60 rpm with a pressure applied to the test cards of 9N. The abrasion medium on the wheels is 3M Scotch Brite fiber web CF-HP Typ 7498 (F-SFN). The cards are submitted to 500 rpm. The gloss level at 20° and 60° is measured before and after the Taber Test and the change in gloss units is determined. A small change in gloss units indicates good abrasion resistance. The results are set forth in Table 2 and in FIG. 2.

The abbreviations appearing in the Tables below are defined as follows:
APS—weight median particle size
PV—pore volume
SA—surface area
PE—polyethylene
COMP—comparison

TABLE 2

| Matting Agent | PV ml/gl | SA m²/gr | APS μm | Cristallinity % | Abrasion resistance DELTA Gloss* 20° | 60° | Wax-content % | Wax-Typ | Commercial Brand | Matting Agent in Lacquer 2% | Matting Agent in Lacquer 1 UV % |
|---|---|---|---|---|---|---|---|---|---|---|---|
| Invention 1 | 1.89 | 320 | 5.9 | 95 | 1.5 | 1.5 | 20 | PE-metallocene | Licocene PE 4202 | 5.0 | 1.9 |
| Invention 2 | 1.85 | 290 | 6.3 | 45 | 4.0 | 7.0 | 20 | PE-metallocene | Licocene PE 3401 | 5.1 | 2.1 |
| Comp 1 | 1.88 | 350 | 6.1 | 15 | 7.0 | 18.0 | 20 | PP-metallocene | Licocene PP 1502 | 5.3 | 2.0 |
| Comp 2 | 1.92 | 310 | 6.0 | 10 | 8.0 | 17.0 | 20 | PE-Ziegler-Natta | Licowax PE 130 | 4.9 | 1.8 |
| Comp 3 | 1.83 | 280 | 6.1 | 5 | 11.0 | 22.0 | 20 | Fischer-Tropsch | Tecero 977 | 4.7 | 1.9 |

The matting agent according to the present invention provides improved abrasion resistance over other coatings made with conventional matting agents. For example, reduction in gloss units for a coating including a matting agent of the present invention after subjecting the coating to the Abrasion Test as defined herein is less than 10 units at 60° and 5 units at 20°, preferably less than 7 units at 60° and 4 units at 20°, more preferably less than 5 units at 60° and 3 units at 20°, and even more preferably less than 3 units at 60° and less than 2 units at 20°.

In addition, the matting agent of the present invention provides equivalent matting efficiency as other conventional matting agents and increased chemical resistance over conventional matting agents.

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, The results in Table 2 and FIG. 1 indicate that when particle size and wax content are kept relatively constant, a matting agent having a high crystallinity wax in the range of the invention has better abrasion resistance than a matting agent having a low crystallinity wax outside the range of the invention. Compare Invention 1 and 2 with COMP 1-3, where the abrasion resistance of the coating made with the matting agent of the present invention is at least double that of other matting agents.

It has also been unexpectedly found that abrasion resistance is enhanced when using matting agents having a smaller APS at the lower end of the particle size range claimed for this invention. See FIG. 2 where coatings having an APS of 6 microns have a much lower abrasion resistance than coatings having an APS of 8 microns.

Figure 3:
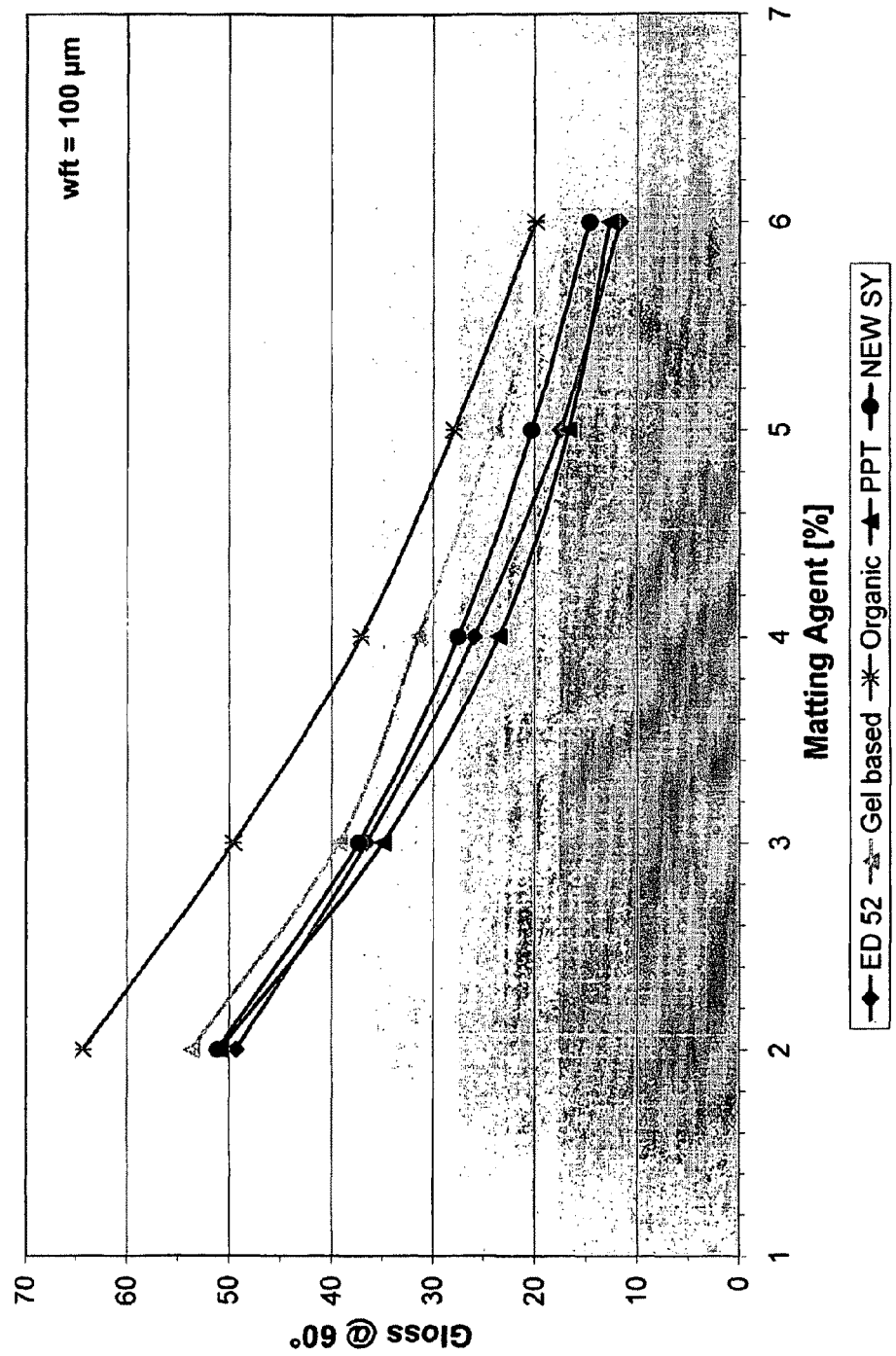
FIG. 3 illustrates the matting efficiency of coatings according to the present invention compared with others in wood lacquer.

FIG. 3 shows that the matting agent of the present invention (red line) provides coatings with matting efficiency at least as equivalent of coatings made with conventional matting agents. The samples are in mixed into Lacquer 2 as described above in Examples 1-5. The light blue line shows the matting efficiency of a commercial organic matting agent, Pergopak M3, available from Deuteron GmbH. The yellow line shows a commercial gel based matting agent, Fuji Sylysia 276, available from Fuji Sylysia Chemical, Ltd., and the green line shows a commercial silica gel matting agent, Syloid ED52, available from W. R. Grace & Co. The dark blue line shows the efficiency of a commercial precipitated silica matting agent, Acematt OK412, available from Degussa AG.

Figure 4:
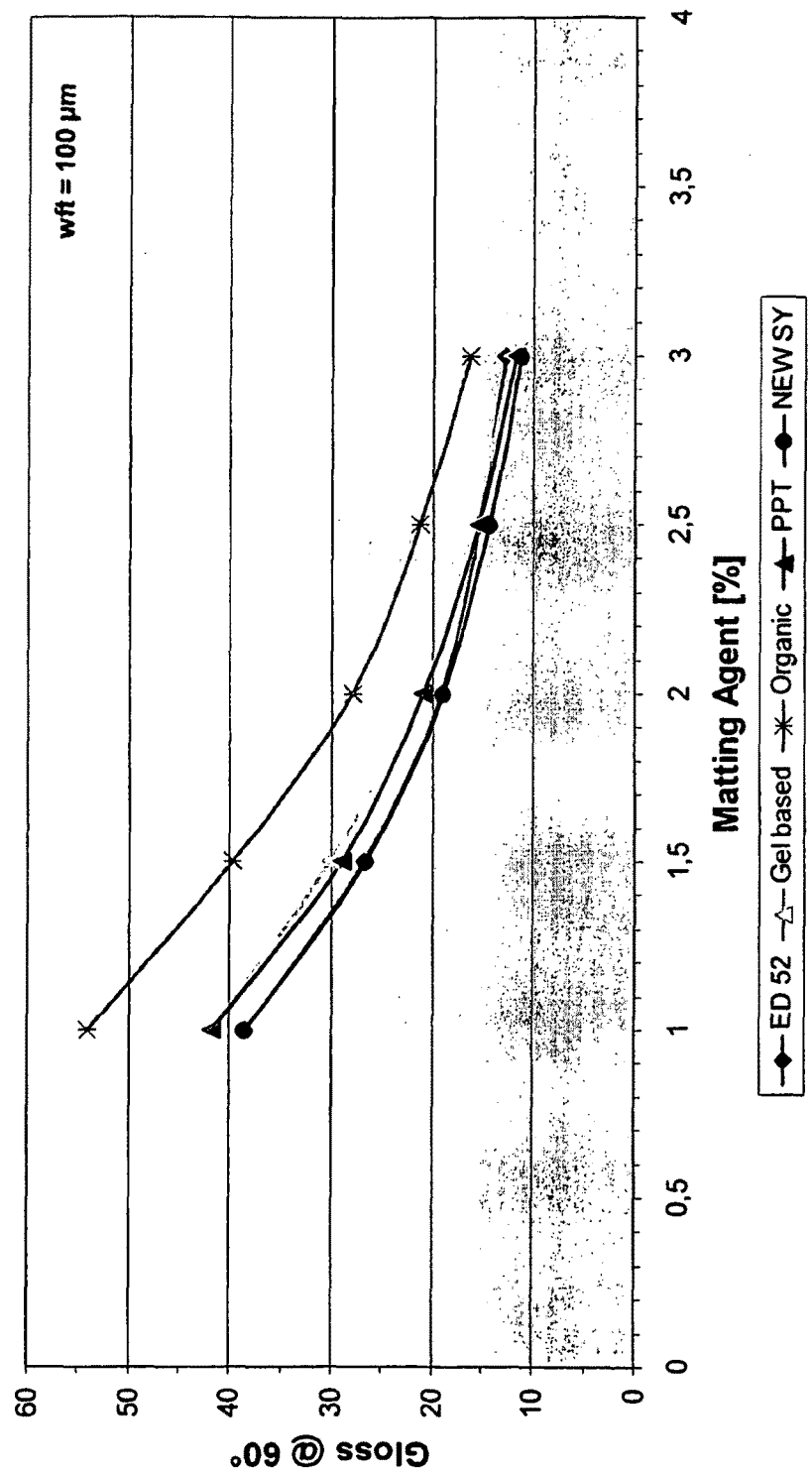
FIG. 4 illustrates the matting efficiency of coatings according to the present invention compared with others in UV lacquer.

FIG. 4 shows the matting agent of the present invention (red line) in comparison to other commercial matting agents when used in Lacquer 1. The samples are in mixed into Lacquer 1 as described above in Examples 1-5. The light blue line shows the matting efficiency of a commercial organic matting agent, Pergopak M3, available from Deuteron GmbH. The yellow line shows a commercial gel based matting agent, Fuji Sylysia 276, available from Fuji Sylysia Chemical, Ltd., and the green line shows a commercial silica gel matting agent, Syloid ED52, available from W. R. Grace & Co. The dark blue line shows the efficiency of a commercial precipitated silica matting agent, Acematt OK412 available from Degussa AG.

The chemical resistance of these different matting agents are tested by dispersing them into Lacquer 1 using a Dispermat VMA available Getzmann 3000 rpm for 10 minutes. The amounts of matting agent added depend upon the gloss achieved and are set forth in Table 3. The lacquer is applied as a film on the black test cards at a thickness of 100 μm using a K-Control Coater "K101" available from Erichsen. The film is then dried at 45° C. for 20 minutes in a LUT 6050 drier available from Heraeus. Subsequently, the film is irradiated with 2 UV light for 10 minutes using polymerization equipment Typ M-20-2*1-TR-Ss-SLC available from IST. After one week at room temperature, the chemical resistance of the coatings is tested using the different liquids set forth in FIG. 5. The method is described in DIN EN 12720, DIN 68861-1.

TABLE 3

% matting agent depends on Gloss

| Matting Agent | FIG. 4 Legend | Percent Matting Agent | Gloss | Chemical Resistance |
|---|---|---|---|---|
| Organic MA | Light blue | 2.6% | Gloss 20° | Poor |
| Gel based MA | Yellow | 2.1% | Gloss 20° | Poor |
| Precipitated MA | Dark blue | 2.1% | Gloss 20° | Fair |
| Syloid ED52 | green | 1.9% | Gloss 20° | Good |
| Invention | red | 1.9% | Gloss 20° | Excellent |

Figure 5:
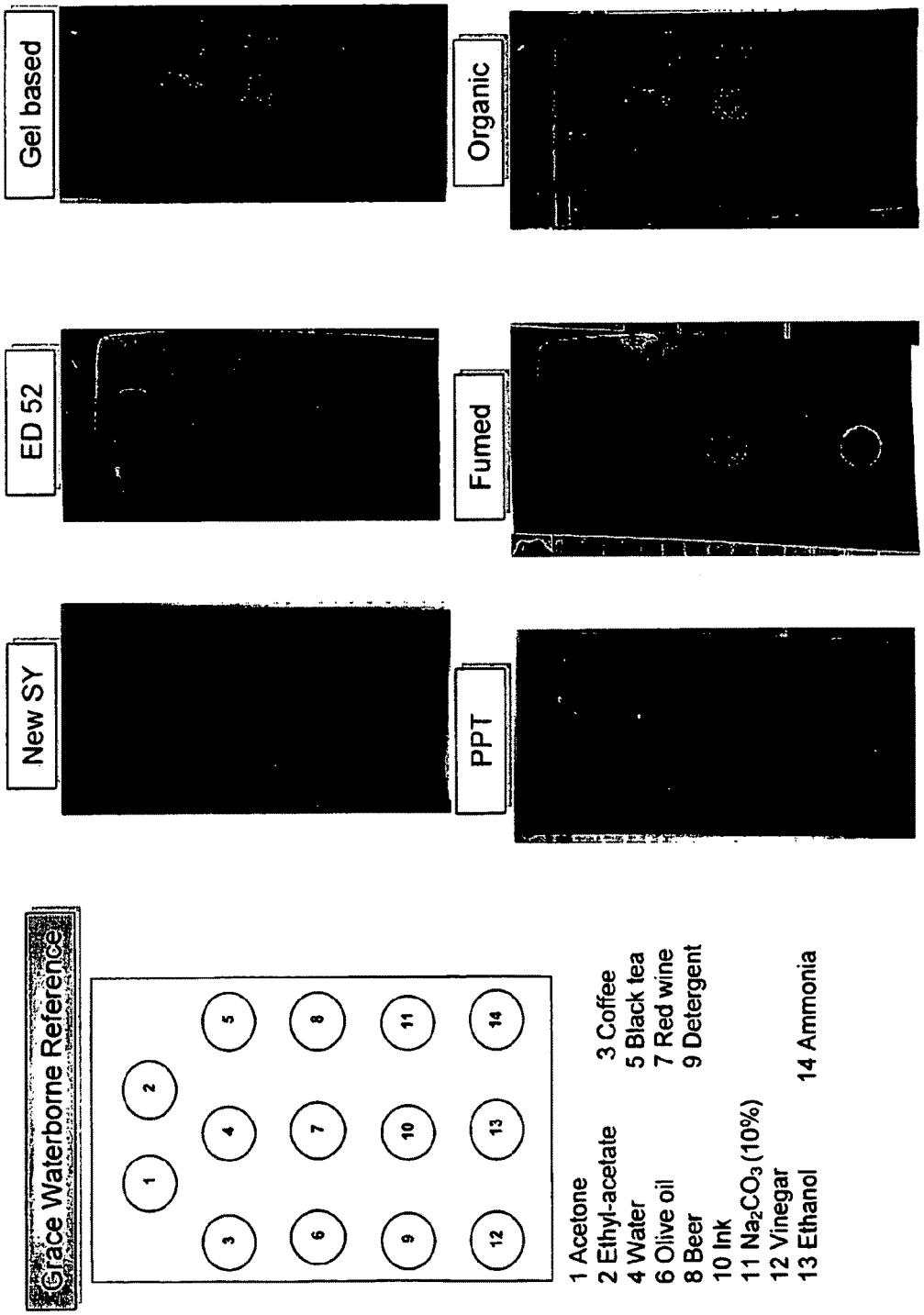
FIG. 5 illustrates the chemical resistance of coatings of the present invention as compared to others.

FIG. 5 shows an unexpected effect that the matting agents of the invention provide coatings with improved chemical resistance over coatings made with conventional matting agents. For example, non-matted waterborne coating results in blister formation with water, red wine, and ink; with good resistance against tee, coffee and $Na_2CO_3$-solution. A coating made with SYLOID ED52 as the matting agent is very resistant against water, coffee, tea and red wine; and possessed less resistance against ethanol and ink; formed blisters with beer only; and moderate brightening of the stains. Silica gel coatings resulted in the general tendency to form blisters with most test substances. Coatings made with precipitated silica matting agent resulted in the destruction of film by coffee, ink, red wine and water; complete film destruction by ethanol; and the formation of very large blisters. Coatings made from fumed silica matting agent yielded poor resistance against water, coffee, tea, and beer; destruction of film by red wine, ink and ethanol; and the formation of large number of blisters and white stains. Organic matting agent coatings provided generally poor resistance against most test substances; destruction of film by water, coffee, red wine and beer; and the formation of large number of blisters; and very bright stains. Coatings made from the matting agent of the present invention provides the most improved performance, including high resistance against red wine and beer; good resistance against water, coffee, tea with slightly less resistance against ethanol and ink; no formation of blisters; and moderate brightening of the stains.

What is claimed is:

1. A matting agent useful for the preparation of matted coatings comprising,
   inorganic oxide particulates; and
   wax coated on the inorganic oxide particulates,
   wherein the wax possesses a crystallinity of about 50% or more and said wax is present in an amount ranging from 15 wt % to 30 wt % based on a total weight of said matting agent.

2. A matting agent according to claim 1, wherein said wax possesses a crystallinity of about 55% or more.

3. A matting agent according to claim 1, wherein said wax possesses a crystallinity of about 60% or more.

4. A matting agent according to claim 1, wherein said wax possesses a crystallinity of about 70% or more.

5. A matting agent according to claim 1, wherein said wax possesses a crystallinity of about 80% or more.

6. A matting agent according to claim 1, wherein said wax comprises a polyolefin.

7. A matting agent according to claim 1, wherein said inorganic oxide comprises silica, alumina, magnesia, titania, zirconia, iron oxide or mixtures thereof.

8. A matting agent according to claim 1, wherein said inorganic oxide possesses a median particle size of about 2 to 12 microns.

9. A coating formulation useful for the preparation of matted coatings comprising,
   inorganic oxide particulates;
   wax coated on the inorganic oxide particulates; and
   one or more coating formulation components;
   wherein the wax possesses a crystallinity of about 50% or more, and is present in an amount ranging from 15 wt % to 30 wt % based on a total weight of said inorganic oxide particulates and said wax coated on the inorganic oxide particulates.

10. A coating formulation according to claim 9, wherein said wax possesses a crystallinity of about 60% or more.

11. A coating formulation according to claim 9, wherein said wax possesses a crystallinity of about 70% or more.

12. A coating formulation according to claim 9, wherein said wax possesses a crystallinity of about 80% or more.

13. A coating formulation according to claim 9, wherein said wax comprises polyethylene, polypropylene or mixtures thereof.

14. A coating formulation according to claim 9, wherein said inorganic oxide comprises silica, alumina, magnesia, titania, zirconia, iron oxide or mixtures thereof.

15. A coating formulation according to claim 9, wherein said inorganic oxide comprises possesses a median particle size of about 2 to 12 microns.

16. A matted coating comprising,
   inorganic oxide particulates; and
   wax coated on the inorganic oxide particulates,
   wherein the wax possesses a crystallinity of about 50% or more, and is present in an amount ranging from 15 wt % to 30 wt % based on a total weight of said inorganic oxide particulates and said wax coated on the inorganic oxide particulates.

17. A matted coating according to claim 16, wherein the abrasion resistance of said coating using the Taber Test is less than 10 units of gloss at 60°.

18. A matted coating according to claim 16, wherein the abrasion resistance of said coating using the Taber Test is less than 5 units of gloss at 20°.

19. A matting agent according to claim 1, wherein said wax comprises a polyolefin formed via a metallocene polymerization process.

* * * * *